Aug. 13, 1946.   E. F. ZAP   2,405,726
AIRPLANE WING CONSTRUCTION
Filed Aug. 14, 1940   6 Sheets-Sheet 1
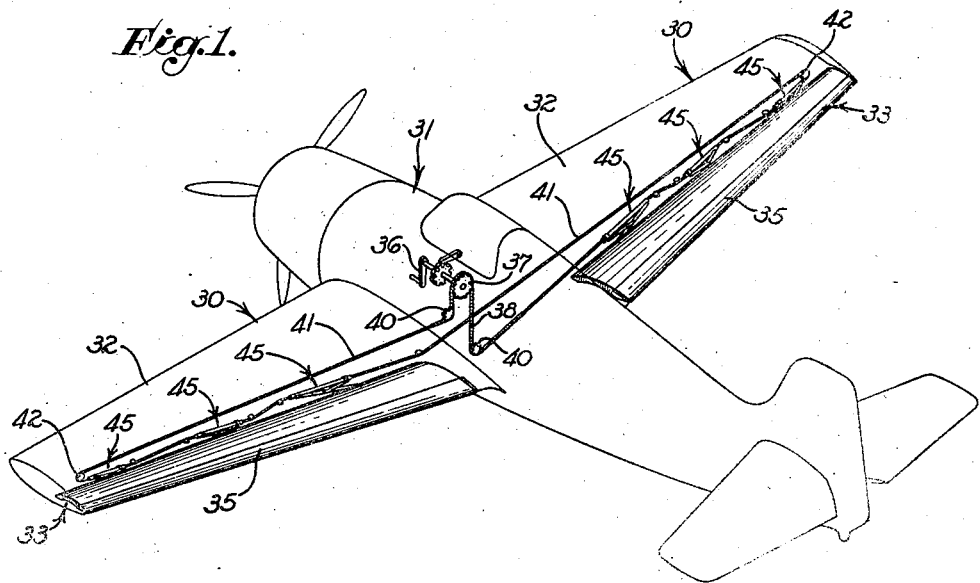
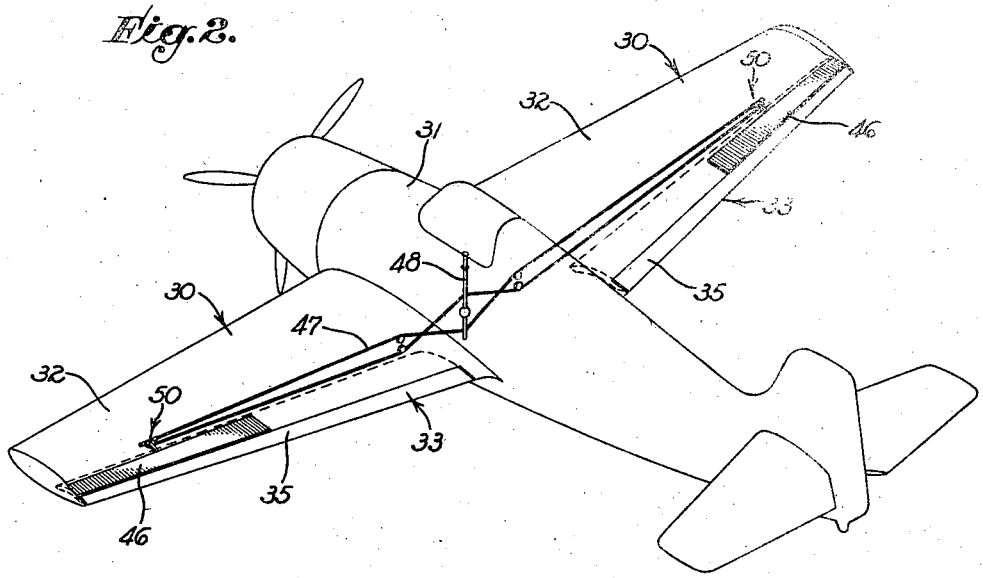
INVENTOR
EDWARD F. ZAP
BY HARRIS, KIECH, FOSTER & HARRIS
FOR THE FIRM
ATTORNEYS

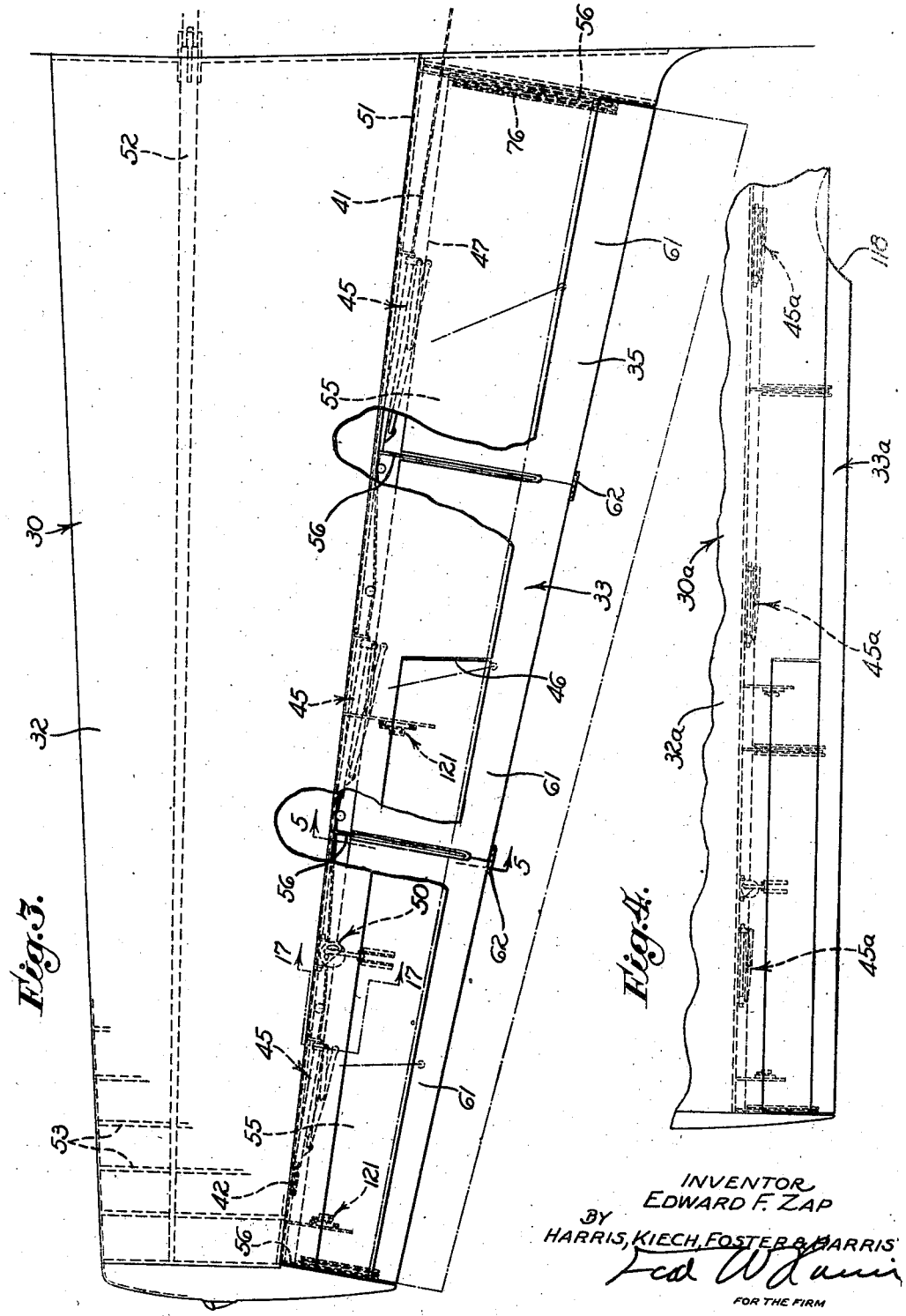

Aug. 13, 1946.   E. F. ZAP   2,405,726
AIRPLANE WING CONSTRUCTION
Filed Aug. 14, 1940   6 Sheets-Sheet 3
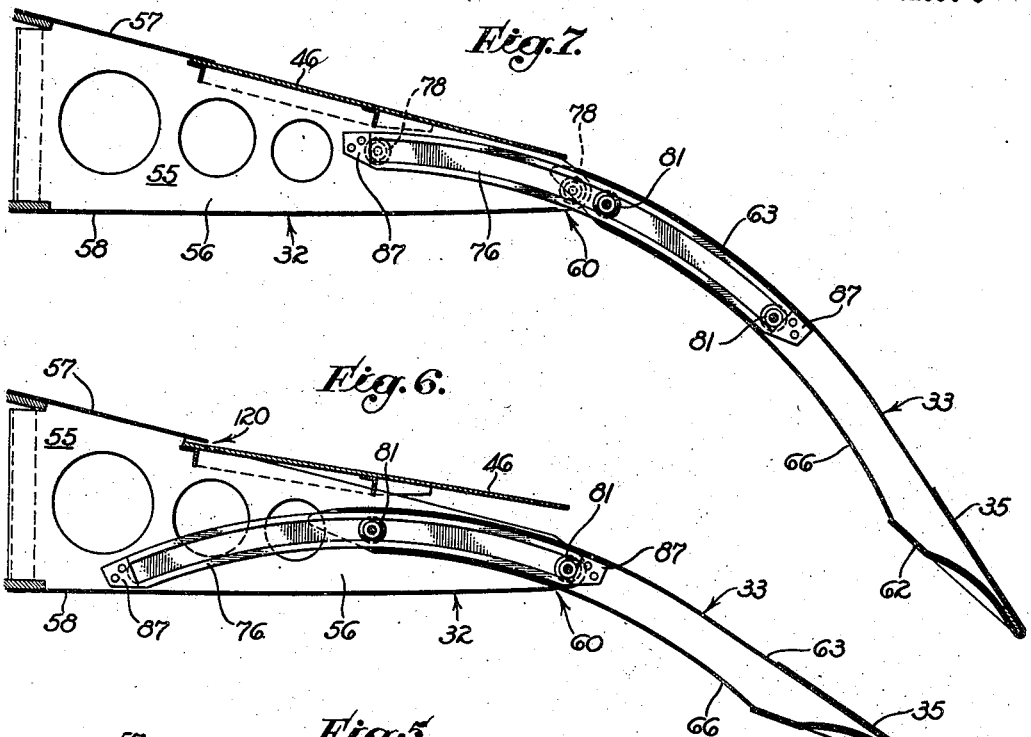
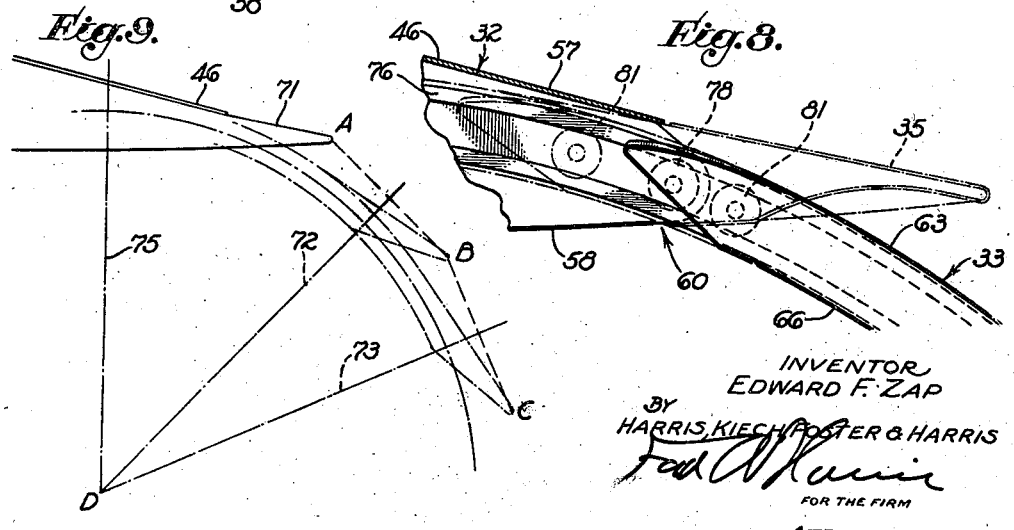
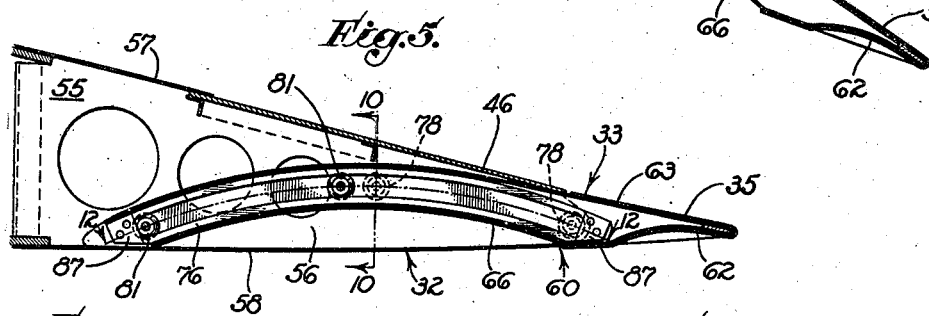
INVENTOR
EDWARD F. ZAP
BY
HARRIS, KIECH, FOSTER & HARRIS
FOR THE FIRM
ATTORNEYS

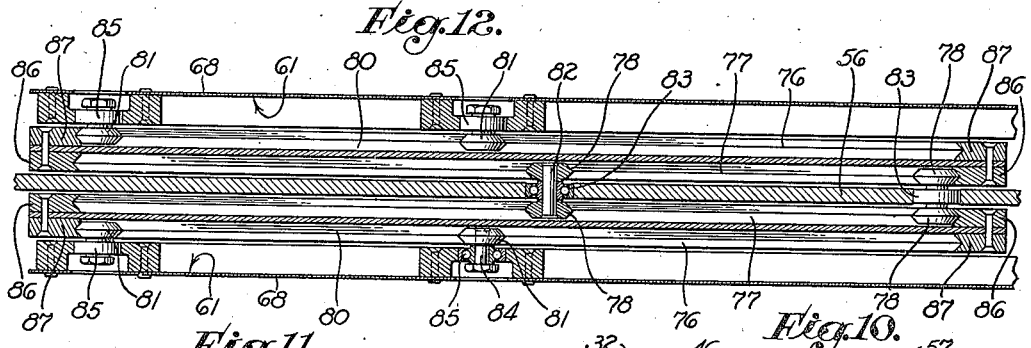

Aug. 13, 1946.   E. F. ZAP   2,405,726
AIRPLANE WING CONSTRUCTION
Filed Aug. 14, 1940   6 Sheets-Sheet 5

INVENTOR
EDWARD F. ZAP
BY
HARRIS, KIECH, FOSTER & HARRIS
FOR THE FIRM
ATTORNEYS

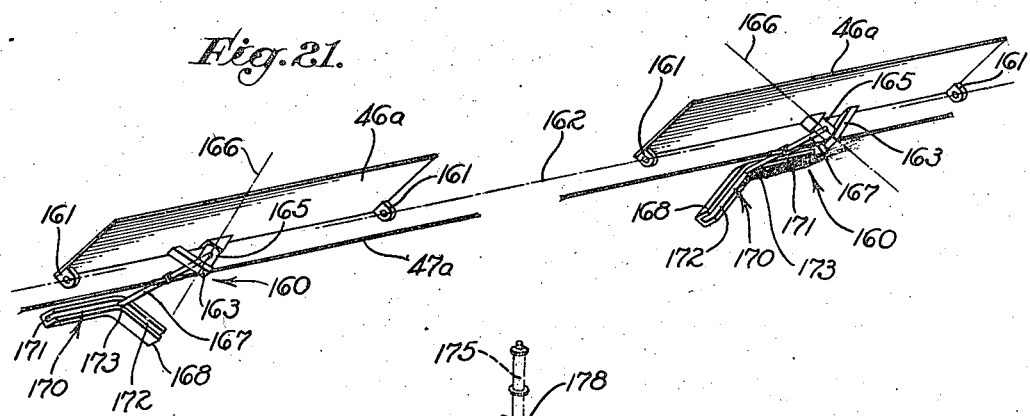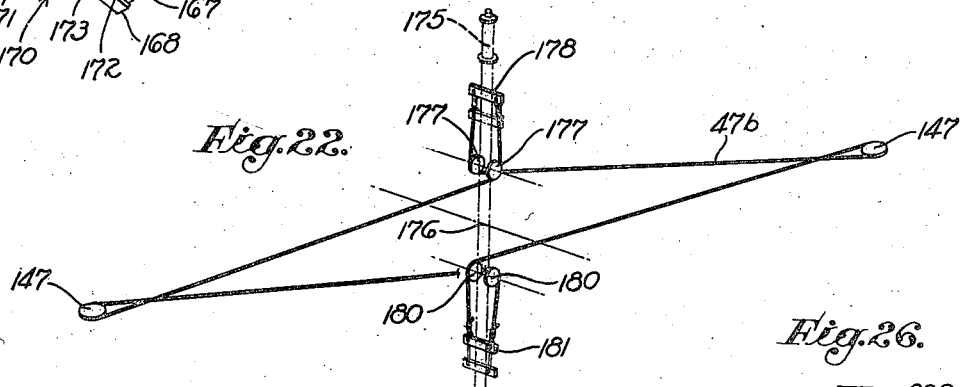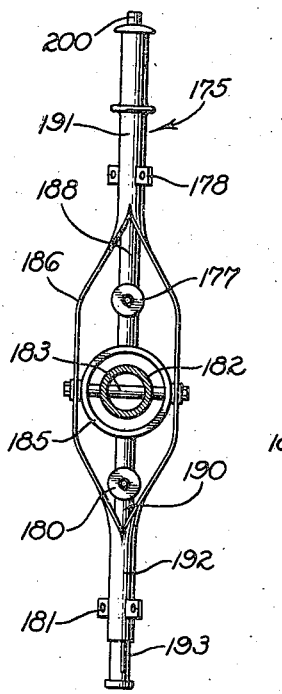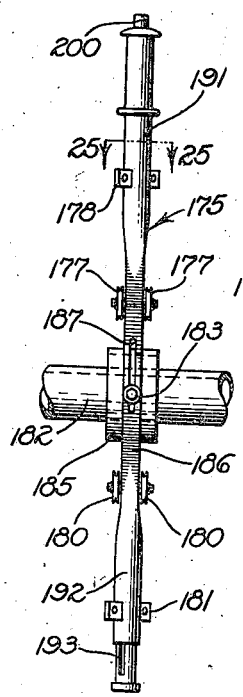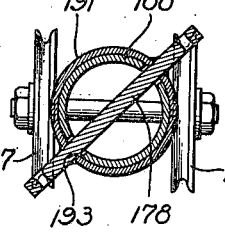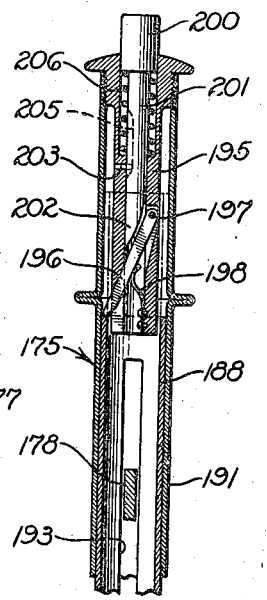

Patented Aug. 13, 1946

2,405,726

UNITED STATES PATENT OFFICE 2,405,726

AIRPLANE WING CONSTRUCTION

Edward F. Zap, Los Angeles, Calif.

Application August 14, 1940, Serial No. 352,516

4 Claims. (Cl. 244—42)

My invention relates to airfoils, with special reference to wing construction, and is directed to an improved high or variable lift wing. The preferred form of the invention combines a novel flap construction with a novel lateral or aileron control.

In the study of numerous airfoils in aerodynamic research it has been well established that no one airfoil configuration is highly efficient at opposite extremes of operating conditions. There is unavoidably a conflict between, on the one hand, the wing characteristics required for maximum speed normal flight, and, on the other hand, the wing characteristics necessary for take-off with short ground runs under heavy load or necessary for landing at steep angles at low speeds. For a given airplane, a wing inherently favoring high speed invariably has insufficient area and camber for optimum performance in take-off and landing; and, conversely, a wing affording the high maximum lift coefficient required for optimum take-off and landing is inherently incapable of performance in the highest speed ranges.

In recognition of these contradictory requirements, numerous types of so-called variable or high-lift wings have been designed, the underlying conception being that a wing having a normal configuration inherently suitable for high speed flight may be made adjustable to a configuration for relatively high lift when required. In general, such a variable lift wing comprises a main airfoil and an auxiliary airfoil movable relative to the main airfoil to vary the effective camber of the wing and in some cases to vary the effective chord as well.

One line of development has been directed to extensible wings. Theoretically a wing of extensible construction is quite desirable since it may be designed for smooth transition from one unbroken configuration to another over a wide range of extension, but no extensible wing of the prior art has been widely successful in practice. It is a difficult engineering problem to design a practical telescoping internal wing structure and this problem is especially difficult for military aircraft. A military wing is so largely employed for storage and for housing military devices that very little room is left for telescoping structure and for mechanism to actuate the telescoping structure.

Another line of development has been directed to the use of a hinged flap mounted on the under surface or at the trailing edge of an aircraft wing. While a hinged flap may be employed to vary the effective camber of an airplane wing, it is not so readily employed to increase the effective chord of the wing. A further difficulty is that a hinged flap does not afford smooth, unbroken configurations over any substantial range of adjustment, especially if the hinged flap is of the type that moves into and out of a recess in the under portion of the wing.

Notwithstanding these defects in prior art structures, hinged flaps have found limited application in commercial aircraft. In military aircraft, however, not even the hinged-flap type of variable lift wing has found extensive service heretofore, in part, because of aerodynamic deficiencies in known flap structures and, in larger part, because the space available in the wing of a military aircraft is too restricted for conventional mechanism to control and operate flap members. Designers of military aircraft have therefore been limited in the past to airfoils suitable for take-off and landing and in compromising between conflicting requirements have been forced to use wing configuration in which the wing area and camber are excessive for high speed flight and yet insufficient to afford adequate lift for quick take-off and low speed landing. That wings of fixed configuration are employed on military aircraft at this late date is a striking fact because it has been known for years that the maximum coefficient of lift of a basic airfoil section may be increased from 40% to 60% by the addition of a controllable flap.

The general object of my invention is to provide a normally high speed airfoil that is readily adjustable to relatively high lift for take-off and is further adjustable to both relatively high lift and increased drag for landing. It is proposed to provide for such variability with safe, efficient, and relatively simple structure, and to do so within the strict requirements of military aircraft.

Among the objects relating to the variable airfoil itself are: To provide a telescoping type of auxiliary airfoil retractible into the wing but requiring relatively little housing space along the chord dimension of the wing; to provide a mounting structure for such an auxiliary airfoil that in retracted disposition is substantially coextensive with the auxiliary airfoil; to provide an extensible flap movable to a position of intermediate extension for relatively high lift with nominal drag and movable to an extreme position of extension for both relatively high lift and relatively high drag; to provide an auxiliary airfoil that inherently requires only minor control forces; to provide an extensible air flap having an inherent but moderate tendency to retract at all positions of extension; to provide a construction in which it is feasible to employ a flap for the full span of the wing; to provide a retractible flap that may be extended to the end of a tapered wing; to provide an extensible flap for a tapered wing that will vary the chord and camber of the wing in proportion to the basic chord of the wing at various wing stations; to provide a wing that may be extended in chord dimension with smooth transition from one ideal airfoil configuration to another, with special reference to the maintenance of a smooth upper wing surface; to provide a wing variable in chord and camber in which an air jet passage opens automatically at relatively high camber; to provide a flap adapted to serve as an automatic valve for a jet-type aileron control; to provide a flap comprising easily replaceable sections of convenient size for fabrication; to add a flap and flap-control mechanism to a basic airfoil without addition of parasite drag; to provide control and actuating mechanism for a flap without subjecting the flap to lateral stress; to provide a mechanism for a flap that in response to an actuating movement of given magnitude shifts the flap by various predetermined amounts at various stations to maintain to a substantial extent proportional configuration of a tapered wing; and to provide a flap-operating mechanism that is substantially frictionless and exerts maximum force as the flap approaches maximum extension. A further object of the invention is to provide a telescoping rearward flap of greater camber than the camber of the wing and movable along a rearward and downward path of greater camber than the mean camber of the wing, whereby the extended panel curves downwardly substantially below the extended mean camber line of the wing to result in substantially greater increase in drag than would be achieved by correspondingly extending the wing along the mean camber line of the wing.

With reference to the aileron control incorporated in my wing construction as considered apart from the wing flap, some of my objects are: To provide an efficient lateral or rolling control that may be applied to a wing having a full-span flap at its under surface or at its trailing edge; to provide an effective aileron on the upper surface of a wing substantially forward from the trailing edge of the wing; to provide such an upper-surface aileron that is effective at high speed and at low angles of attack and as well at low speeds and high angles of attack; to provide a jet-type aileron control that is effective with substantially no aerodynamic lag; to provide an inherently stable aileron panel that approaches aerodynamic balance to a desirable degree and responds substantially uniformly to a moderate control force throughout its operative range; to provide control means and mounting means for an aileron panel that are located entirely within the normal configuration of the wing on which the panel is mounted but cause the panel to move about an axis external of the wing; to provide a substantially frictionless but positive control for a pair of opposite aileron panels that will move either panel to effective disposition and simultaneously lock the other panel at neutral disposition; and to provide an operating mechanism for a pair of opposite aileron panels by means of which the ailerons may be moved simultaneously and synchronously upward to compensate for ground effect in landing an aircraft.

The above and other objects and advantages of my invention will be apparent in my following detailed description of a preferred wing construction considered with the accompanying drawings.

In the drawings, which are to be taken as illustrative only:

Fig. 1 is a diagrammatic view in perspective showing my flap and flap control incorporated in an aircraft;

Fig. 2 is a similar view showing how my aileron and aileron-control mechanism may be incorporated in an aircraft;

Fig. 3 is a plan view of an aircraft wing embodying the proposed form of my invention;

Fig. 4 is a fragmentary plan view of a straight wing embodying the invention;

Fig. 5 is an enlarged transverse section taken as indicated by the line 5—5 of Fig. 3, showing the flap in retracted disposition;

Fig. 6 is a similar view with the flap extended to an intermediate position;

Fig. 7 is a similar view with the flap at maximum extension;

Fig. 8 shows a fragment of Fig. 7 on an enlarged scale;

Fig. 9 is a diagram indicating how the design of the flap may be approached;

Fig. 10 is a fragmentary section on an enlarged scale taken as indicated by the line 10—10 of Fig. 5;

Fig. 11 is a similar view taken near the tip of the wing;

Fig. 12 is a section on an enlarged scale taken as indicated by the curved line 12—12 of Fig. 5;

Fig. 13 is a plan view on an enlarged scale of one of the actuating units that operate the flap;

Figs. 14, 15, and 16 are greatly enlarged sections taken as indicated by the corresponding lines 14—14, 15—15, and 16—16 of Fig. 13;

Fig. 17 is a spanwise section through a flap compartment taken as indicated by the broken line 17—17 of Fig. 3;

Fig. 18 is a fragmentary view of the same character at another station of the wing;

Fig. 19 is a plan view of a pair of actuating units that may be employed in the wing of an aircraft to control a pair of my aileron panels;

Fig. 20 is a fragmentary section on an enlarged scale taken as indicated by the line 20—20 of Fig. 18;

Fig. 21 is a diagrammatic view in perspective showing aileron-actuating units that may be substituted for the actuating units of Fig. 19;

Fig. 22 is a schematic view of a table type aileron-control system that may be employed in my invention;

Fig. 23 is a side elevation of a control stick that may be incorporated in the control system of Fig. 22;

Fig. 24 is a side elevation of the control stick taken at 90° from Fig. 23;

Fig. 25 is an enlarged cross section taken as indicated by the line 25—25 of Fig. 23; and Fig. 26 is an enlarged longitudinal section of the upper end of the control stick shown in Figs. 23 and 24.

Figs. 1 and 2, which are intended to represent the same aircraft, show a pair of tapered wings 30 on a fuselage 31. Each of the wings 30 includes a main wing 32 rigidly mounted on the fuselage and an auxiliary airfoil or flap generally designated 33, that is telescoped into the main wing and is adapted for retractible extension rearward from the wing. Preferably a trailing portion 35 of the flap 33 protrudes at all times to serve as the trailing portion of the overall wing, the flap being normally retracted and the trailing portion 35 of the flap normally combining with the main wing 32 to form an inherently high speed airfoil configuration.

To extend and retract the flap 33, the pilot turns a crank 36 connected to a sprocket 37 and thereby shifts a sprocket chain 38 that passes around a pair of smaller sprockets 40. The sprocket chain 38 is connected to a cable 41 to form a continuous flexible member that extends in opposite directions through the two wings 30, the cable passing around sheaves 42 near the tip of the wing. The cable 41 is connected to a series of flap-actuating units generally designated 45, which will be described in detail later.

Fig. 2 shows an aileron panel 46 in each of the wings 30 for lateral control of the aircraft, and it will be noted that the panels are on the upper side of the wing forward of the wing opening through which the flap 33 extends. It is apparent that since the aileron panels 46 and the flap 33 do not interfere with each other, either the aileron panel, or the flap, or both aileron panel and flap may extend over the full span of the wing. In a construction shown in Fig. 2, for example, the flaps 33 are full length and the aileron panels 46 extend over approximately 40% of the span of each wing. In commercial aircraft and in heavy bombers the aileron panels will ordinarily be of relatively short span while in combat planes the ailerons may extend over 60% or more of the wing. Fig. 2 also shows a control cable 47 connected to a control stick 48 of the aircraft for operating the aileron panels 46. The control cable 47 is operatively connected in each wing to an aileron-actuating unit, generally designated 50, which will be described in detail later.

While the flap arrangement of Fig. 1 and the aileron arrangement of Fig. 2 are independent of each other and are separately applicable to wing constructions, they are functionally interrelated in the present preferred embodiment of my wing construction and their combination is to be regarded as an important feature of the invention.

Fig. 3 shows on a larger scale one of the wings 30 of Figs. 1 and 2. The main wing 32 has the usual internal frame-work including two main spars 51 and 52 and numerous ribs 53. Rearward of the spar 51 the main wing 32 is hollow to provide a series of three flap compartments 55 that are defined by four former ribs 56, the spar 51, the upper skin 57 of the wing, and the lower skin 58. The space relationships of the various movable parts in the flap compartment 55 may be understood by referring to Figs. 3, 17, and 18, and the various dispositions of the flap 33 with respect to the flap compartments are best shown in Figs. 5, 6, and 7.

It will be noted that the trailing edges of the upper and lower wing skin 57 and 58 define a spanwise slot or opening, generally designated 60, through which the flap 33 is extended and retracted, and it will be noted that when the flap is in retracted disposition as shown in Fig. 5, the trailing portion 35 of the flap substantially fills the opening 60 and continues the airfoil configuration defined by the two skins of the main wing 32.

Since the flap 33 must retract into the separate flap compartments 55, the flap must be constructed to clear the various partitioning ribs 56. One feature of my invention is the conception of constructing the flap 33 as an assembly of flap panels 61 that are held together in a unitary manner by connector plates 62 (Fig. 3) along the trailing edge 35 of the flap. Among the advantages of such a construction are, first, that the ribs 56 may be spaced relatively closely together as required for wing strength, second, that the flap panels 61 may be of convenient size for fabrication, and, third, that a flap with localized damage may be repaired expeditiously and economically by replacement of only one panel.

As indicated in Fig. 17, each of the panels 61 of the flap, including a corresponding part of the trailing portion 35 of the flap, has an upper skin 63, a corrugated internal reinforcement 65, and a lower skin 66. As indicated in Figs. 10 and 11, the sides of the flap panels 61 are formed by sheet metal channels 68 that are set inward from the edges of the upper skin 63 and the lower skin 66, thereby forming what may be termed longitudinal recesses 70 along the panel edges adjacent the various former ribs 56.

The panel 33 may be flat or of any suitable cross-sectional shape, but in the preferred form of my invention the flap is of arcuate configuration. While such an arcuate flap may be retractibly extended in various rearward directions, I prefer to arrange the flap to move rearward along a path conforming substantially to the arcuate configuration of the flap. Some of the advantages inherent in such an arrangement are: First, a flap having a surface of given dimension fore and aft may be stored in a flap compartment of less than that dimension; second, relatively little flap-actuating force is required to extend the flap into the air stream; third, an arcuate flap moving downward in an arcuate direction inclines progressively from the chord of the wing and therefore changes the effective camber of the wing at an increasing rate; and, fourth, whether the curvature of the flap and/or the flap path have one center or a plurality of centers, the character of the flap movement and the aerodynamic effect of the flap movement may be controlled within wide limits at the designing stage by varying the location of the center or centers of curvature. The first and third of these advantages may be greatly augmented by giving the flap substantial curvature relative to the wing. Thus, if the mean camber of the flap substantially exceeds the mean camber of the wing a flap of a given fore-and-aft surface length may be retracted into a fore-and-aft space of the wing less than said surface length, and if such a flap is extended rearwardly along its line of curvature or extended mean camber line the extension of the flap will result in substantially greater increase in drag than would be achieved by correspondingly extending the wing rearwardly along the mean camber line of the wing.

An advantageous method of laying out the flap arrangement may be understood from Fig. 9 in which the full line 71 defines a wing configuration for high speed flight and the point A designates the trailing edge of the wing configuration. The designer first locates a downward and rearward flap extension point B which is calculated to produce the lift required for take-off and then locates a still lower flap extension point C to give high lift and drag for landing at low speed with steep approach. It is to be noted that the inclination of the line B—C is substantially greater than the inclination of line A—B because the designer wants greater increase in camber with corresponding increase in drag as the flap approaches its limit position. The perpendicular 72 bisecting the line A—B and the perpendicular 73 bisecting the line B—C intersect at a point D, which is the center of a circle passing through the three points A, B, and C. The desired aerodynamic effect may be had by basing the configuration of the flap and the path of movement of the flap on this circle.

In the above defined procedure the location of the points B and C determines the location of the center of curvature D. In another procedure, the locations of the points B and D are decided upon thereby determining a circle on which point C must lie. For example, a designer may achieve the desired aerodynamic effect by locating the point B 10% of the wing chord to the rear of the point A and 10% of the wing chord below the point A, drawing the perpendicular 72 bisecting the line A—B, and then dropping a perpendicular 75 from the 90% point of the wing chord. The line 75 cuts the line 72 to determine the center of curvature D and thereby the circle on which the point C is to be located.

One feature of the preferred form of my invention is the automatic opening of an air-jet passage from the lower side of the wing to the upper side of the wing as the flap 33 reaches maximum extension. Such a passage and the automatic control of the passage may be provided by various arrangements. In the preferred form of my invention shown in the drawings, the air-jet passage is provided at the opening 60 through which the flap extends and the valve action is provided by the flap itself. As best shown in Fig. 8, at maximum extension of the flap, the inner end of the flap is spaced from both the lower and the upper edges of the opening 60 so that air may sweep around the forward edge of the flap from the under side of the wing to the upper side of the wing. Fig. 5, in which the flap 33 is in retracted position, and Fig. 6, in which the flap is at a position of intermediate extension, both show the upper skin 63 of the flap closely adjacent the upper skin 57 of the main wing 32, the major portion of the upper flap skin being concentric to the point D (Fig. 9). Preferably, however, the last portion of the upper skin 63 of the flap to be exposed as the flap approaches maximum extension is bent downward to sharper curvature so that the air-jet passage opens progressively as the air flap approaches maximum extension.

Any suitable means may be provided to movably mount the flap 33 on the main wing 32, but in applying my invention to military aircraft it is essential that the mounting means to be within the capacity of the various flap compartments 55. I solve the problem of achieving a compact arrangement by movably mounting the flap on a suitable flap-support means and in turn movably mounting the flap-support means on the main wing so that the effective range of movement of the flap is provided in part by a range of relative movement between the flap and the flap-support means and in part by a range of relative movement between the flap-support means and the main wing. A further feature of my invention here is the concept of causing such a flap to move in the desired arcuate path by employing a combination of rolling means and arcuate guide means to connect the flap with the flap-support means and employing the same combination to mount the flap-support means on the main wing. One advantage of such an arrangement is the fact that the movable support-means may be coextensive with the flap in the fully retracted position of the flap and another advantage is that I avoid the necessity of any member extending rigidly forward from the inner edge of the flap.

The movable support means for the flap 33 in the present construction comprises a plurality of arcuate tracks 76 mounted on the ribs 56 of the main wing 32, the tracks being shown in side elevation in Figs. 5–7 and being shown in section in Figs. 10–12. Each of the arcuate tracks 76 extends through one of the previously mentioned longitudinal recesses 70 along a side edge of the flap panel 61 and has one channel 77 to cooperate with a pair of fixed rollers 78 on the adjacent rib 56 and has a second channel 80 to cooperate with a pair of rollers 81 carried by the flap panel. The stationary rollers 78 may be carried by suitable spindles 82 journalled in low-friction bearings 83 on the ribs 56 and the flap roller 81 may likewise be carried by spindles 84 journalled in low-friction bearings 85 that are mounted on the side edges of the flap panel.

The retraction of each track 76 into the flap compartment 55 is limited by abutment of a stop block 86 in the track channel 77 against one of the rollers 78 and extension of the track rearward from the main wing is in like manner limited by a second similar stop block 86 in the channel abutting the other roller 78. In like manner stop blocks 87 are provided at opposite ends of the various track channels 80 to cooperate with the flap rollers 81 to limit the forward and rearward movement of the flap 33 relative to the various tracks 76.

The flap-actuating units 45, which by preference are placed in each of the flap compartments 55, may be constructed as indicated by Figs. 13–17. Each of a pair of brackets 90 mounted on the wing spar 51 by suitable bolts 91 has a thimble portion 92 through which extends the flap-control cable 41. The opposite ends of a tubular member 93 are rotatably mounted on the thimble portion 92 of the two brackets 90 and may be provided with suitable bushings 95. The tubular member 93 has a longitudinal slot 96 (Figs. 14 and 15) and at one end is fixedly embraced by a sleeve 97 having a laterally extended ear 98 that carries a pivot 99. Mounted on the tubular member 93 for movement by the cable 41 toward and away from the fixed pivot 99 is a bracket generally designated 100 comprising a cylindrical body 101 inside the tubular member and an ear 102 that slidingly extends radially outward through the slot 96, the ear carrying a pivot 103 for movement toward and away from the pivot 99. The cylindrical body 101 is connected at its opposite ends to the flap-control cable 41 and to minimize friction the cylindrical body may be provided with a pair of rollers 105 in intersecting planes, the rollers being mounted on suitable low-friction bearings 106 in the cylindrical body.

One end of an actuating arm 107, which end is preferably formed as a clevis 108, is mounted on the pivot 103, and the pivot as indicated in Fig. 14 may be journalled in a suitable low-friction bearing 110 in the bracket ear 102. The other end of the actuating arm 107 has a suitable universal connection with the forward end of the flap 33, the arm, for example, being connected by a pivot 111 to a clevis 112, and the clevis in turn being pivoted by a pin 113 to a pair of bracket members 115 on the flap 33. To complete the actuating unit a link 116 connects the pivot 99 on the tubular member 93 to a pivot 117 at an intermediate point on the actuating arm 107. The various moving parts of the actuating unit are so dimensioned and so disposed that movement of the bracket 100 toward and away from the pivot 99 causes the outer end of the actuating arm 107 to move rearward and forward substantially in a vertical plane longitudinally of the aircraft to move the flap 33 without placing the flap under any lateral or spanwise stress.

In applying my invention to a wing of the tapered platform shown in Fig. 3, I prefer to move the flap at various wing stations approximately in proportion to the basis wing chord at the stations so that the effective chord and the effective camber may vary in proportion to the wing taper. To this end the flap 33 is given the general configuration of a fragment of a cone. The diameter as well as the transverse surface dimension of the segment varies in accord with the wing taper and the center of curvature D (Fig. 9) for the various sections of the flap lie along the axis of the imaginary cone. As such a flap is rotated about the imaginary conic axis rearward away from the main wing of the aircraft, the various sections of the flap extend the effective chord of the wing in proportion to the local diameters of the imaginary cone and therefore in proportion to the taper of the wing. If desired, of course, the taper of the imaginary cone may differ from the taper of the wing, but a feature of my invention is that by adhering to some conic configuration I simplify the problems of proportionate chord and proportionate camber variation at the various wing sections as well as the problem of extending a telescoping flap to the relatively narrow wing tip.

It is apparent from the foregoing that the flap decreases in curvature progressively toward the wing tip, that each succeeding track 76 has a shorter radius of curvature, and that each of the three flap-actuating units 45 must have a "throw" or flap-actuating movement in proportion to the local radius of curvature of the flap. The three sliding brackets 100 in the three flap-actuating units 45 are moved equal distances by control movement of the flap cable 41, but a feature of my invention is that by varying the length of the three actuating arms 107 and the length of the three links 116 of the actuating units I cause the range of movement of the outer ends of the actuating arms to vary as required for proportional flap movement.

Fig. 4 shows the trailing portion of a straight wing 30a designed for a high-wing monoplane, the straight wing including a main wing 32a, and an extensible flap 33a that is cut away at 118 to clear the aircraft fuselage when in extended disposition. In this embodiment of my invention the flap 33a is shaped as a segment of a cylinder and all of the flap-actuating units 45a are identical in dimension and range of movement.

The means for achieving lateral control for the aircraft by creating rolling moments includes not only the previously mentioned aileron panels 46 in the two wings of the aircraft but also air-jet passages through the wing controlled by the aileron panels. Each of the air-jet passages includes the rearward opening 60 through which the flap 33 extends, the flap compartment 55 beneath the aileron panel 46 and an opening 120 in the upper skin 57 of the main wing (Fig. 6) that is comparable in area to the aileron panel and is normally closed by the aileron panel. It is contemplated that at high flying speed an aileron panel 46 will be raised only slightly, say to angles of 2° to 5°, to serve as an obstacle to air flow and thereby spoil the lift of the wing, the flaps being movable alternately, one panel remaining in its neutral or closed position whenever the other panel is raised to cause a wing to swing downward. At low speeds, however, an aileron panel 46 will be raised to higher angles and the flow of air through the panel opening will become a factor of importance in lateral control. I have discovered that if such a combination of panel and air passage through the wing is placed rearward at least as far as the 80% point of the basic chord of the wing, the desired control forces become effective with no significant aerodynamic lag behind the control movements of the aileron cable.

One problem encountered in the design of such an aileron control is to avoid an undesirable tendency for the aileron panel to seek a slightly open position and to offer relatively great resistance to opening movement beyond that position. One feature of my invention is the concept that this tendency may be avoided by swinging the leading edge of the panel down into the wing, the arrangement of the air passage relative to the panel being such that turbulent air flow acting against the downwardly inclined edge approaches balance with opposing forces about the panel axis. In the preferred arrangement depicted in the drawings a relatively slight tendency for the panel to seek its closed position is effective and substantially constant throughout the range of panel movement so that the applied control forces may be uniform over the range of panel movement. I have discovered that the desired approach to aerodynamic balance may be achieved by arranging the aileron panel to rotate about an axis outside the contour of the wing, the axis being above the panel and rearward of the leading edge of the panel.

The designer will find that the extent to which the leading edge of the aileron panel shifts rearward and downward from the normal closed position depends upon the elevation of the aileron axis and upon the rearward spacing of the aileron axis relative to the leading edge of the aileron at closed position. It will be found that the position of the panel at any given angle of inclination may be adjusted without forward or rearward shift by moving the panel axis along some path and that the position of the panel at the given inclination may be shifted rearward and forward without change in level by moving the panel axis along a second path. The two paths may be located empirically. Each aileron panel may rotate about a single axis or during one portion of its movement may have one center of rotation and move about another axis during another portion of its movement.

One of the important features of my invention is that whether the aileron panel moves about one axis or shifts from one axis to another exterior of the airfoil contour the means for movably supporting the panel to rotate about the exterior axis or axes may lie entirely within the confines of the airfoil configuration.

One form of hinged construction that may be employed to support the aileron panel in the described manner is shown in Fig. 18, there being at least two such hinged arrangements supporting each aileron panel at spaced points. An aileron hinge, generally designated 121 in Fig. 18, includes a bracket 122 mounted on the under side of the aileron panel 46 by means of suitable screws 123 and includes a pair of spaced spindles 125 on the bracket carrying rollers 126. As shown in Figs. 18 and 20, the two rollers 126 travel in a complementary channel 127 in an arcuate track 128 that is fixedly attached to a false rib 130 by suitable rivets 131. The particular track 128 illustrated is concentric to an external panel axis 132.

To facilitate operation of the aileron panel 46 by the corresponding aileron-actuating unit 50 within the flap compartment 55, the panel may be provided with a downwardly extending bracket generally designated 133. The aileron bracket 133, best shown in Figs. 17 and 19, includes a pair of triangular plates 135 with flanged edges that are reinforced by metal straps 136 attached to the panel by rivets 137. Extending forward from the forwardly inclined portion of each of the metal straps 136 is an ear 138, the two ears being parallel for operative connection with the aileron-actuating unit 50.

The specific form of aileron-actuating unit 50 shown in Figs. 17 and 19 includes an operative arm 140 having a universal connection with the panel bracket 133, the arm, for example, being connected by a pivot 141 to a small block 142, the small block in turn having trunnions 143 journalled in the ears 138 of the panel bracket. The other end of the operating arm 140 is formed as a yoke 145 to cooperate with a pair of parallel plates 146 and with an intermediate sheave 147 journalled in the parallel plates. The parallel plates 146 are an integral part of a hollow bracket member 148 having trunnions 150, one of the trunnions being tubular to clear the aileron cable 47 that passes around the sheave 147. The trunnions 150 are journalled in a pair of bearing members 151 mounted on the wing spar 51.

The arms of the yoke 145 extend on opposite sides of the two parallel plates 146 and are interconnected by a cross pin 152 which may carry a sleeve (not shown) for the sake of increased diameter. The two parallel plates 146 constitute guide means for the cross pin 152 and to that end are each provided with a guide slot designated 153 having what may be termed an inoperative or locking portion 155 concentric to the pivot 141 and an operative portion 156 extending toward the aileron bracket 133, the two portions of the guide slot joining at what may be termed a neutral point 157.

The cross pin 152 at the end of the operating arm 140 not only extends through the guide slot 153 of the two parallel plates 146 but also extends through a radial slot 158 in the intermediate sheave 147. Since the inoperative portion 155 of the guide slot 153 in each of the parallel plates is concentric to the pivot 141 at the opposite end of the operating arm, it is apparent that the cross pin 152 may be moved freely along the inoperative portion 155 of the slot without causing movement of the aileron panel 46, and it is further apparent that the inoperative portion 155 of the guide slot in confining the cross pin actually blocks the aileron panel against movement out of its neutral or closed position.

It is contemplated that the control cable 47 will be oppositely connected to the aileron actuating unit 50 in the opposite wings of the aircraft to cause either of the cross pins 152 to move into the inoperative portion 155 of the corresponding guide slot whenever the other cross pin 152 is moved into the operative portion 156 of its corresponding guide slot, whereby one panel will be locked whenever the other aileron panel is raised to an effective position. The indicated opposite connection of the cable with the two aileron-actuating units may be achieved simply by disposing the guide slots 153 on the opposite sides of the aircraft in opposite directions as may be understood by reference to Fig. 19 showing the left guide slot 153 pointing leftward with its inoperative portion 155 and the right guide slot pointing rightward with its inoperative portion 155. Preferably the two cross pins 152 are normally at the neutral points 157, but some variation is permissible in practice.

Fig. 21 shows diagrammatically another form of aileron-actuating unit, generally designated 160, which may be substituted for the aileron-actuating unit 50 of Figs. 17 and 19. In Fig. 21, for simplicity each of the two aileron panels 46a is shown with ears 161 for rotation about an axis 162 near the leading edge of the panel. Each of the aileron panels 46a is provided on its under face with a laterally inclined aileron bracket 163 in which is journalled a small block 165 to rotate about an axis 166 that is inclined relative to the plane of the panel. In my preferred arrangement the axis 166 of each of the brackets is inclined approximately 45° from the plane of the aileron panel. Each of the rotary blocks 165 carries a radially disposed arm 167 that engages a guide member 168, which guide member may be mounted on the wing spar 51. Each of the guide members 168 forms a guide channel, generally designated 170, for the end of the arm 167 and the guide channel 170 has an operative portion 171 substantially parallel to the aileron panel axis 162 and an inoperative or locking portion 172 that is inclined at approximately 45° from the portion 171, the inclination of the inoperative portion 172 conforming approximately to the normal or closed-panel disposition of the corresponding aileron panel bracket 163. The two portions 171 and 172 of the guide channel 170 join at what may be termed a neutral point 173, and it is contemplated that the aileron cable 47a will be so connected to intermediate points of the arm 167 as to normally hold the arm at approximately the neutral points 173 in the respective guide channels 170, as indicated in Fig. 21.

It is apparent from Fig. 21 that when an aileron panel 46a is in its closed or neutral position, the corresponding aileron arm 167 is free to move in the inoperative portion 172 of the guide channel 170 without causing movement of the panel and that the confinement of the arm 167 by the inoperative portion 172 of the guide channel locks the panel against opening movement. It will be further apparent that if the cable 47a shifts one of the arms 167 into and along the operative portion 171 of the corresponding guide channel, the corresponding aileron panel 46a will be swung upward proportionately about the axis 162. By disposing the two guide channels 170 oppositely, as shown in Fig. 21, I provide an arrangement in which shifting of the cable 47a in either lateral direction causes one panel to be locked in neutral position and causes the other panel to be lifted to effective disposition.

Either the pair of aileron-actuating units 50 of Fig. 17 and Fig. 19 or the pair of aileron-actuating units 160 of Fig. 21 may be operated by the simple aileron-control system shown in Fig. 2. In the preferred practice of my invention, however, I employ a control system that additionally permits the pilot at his discretion to lift both of the aileron panels 46 simultaneously to their maximum effective positions to cause a sharp drop in the lift exerted by the two aircraft wings. Such an operation of the two aileron panels may be of service to compensate for "ground effect." When an aircraft makes a gliding approach to the elevated deck of an aircraft carrier, for example, the abrupt ground effect resulting from the sudden reduction in the vertical space beneath the aircraft tends to sustain the aircraft and delay contact with the landing deck. Timely elevation of the two aileron panels simultaneously, however, permits an aircraft of the present type to maintain the desired glide angle and in fact to increase the glide angle to a desirable extent at the proper moment.

Fig. 22 indicates diagrammatically the essential element of a control system that will permit a pilot to operate the two aileron panels simultaneously in the above indicated manner when desired. A control stick, generally designated 175 and indicated by dotted lines in Fig. 22, is pivoted in the usual manner for lateral oscillation about a pivot point 176. Above the pivot point 176 the control stick 175 carries a pair of parallel sheaves 177 and an upper diagonally disposed cable anchorage 178, and in like manner below the pivot point 176 the control stick carries a lower pair of parallel sheaves 180 and a lower diagonally disposed cable anchorage 181. If the cable 47b, which is shown divided into two sections, is disposed around the control stick sheave and the two sheaves 147 of the aileron-actuating unit 50 in the manner indicated by Fig. 22, clockwise movement of the control stick about the pivot point 176 produces counter-clockwise rotation of the two actuating sheaves 147 and vice versa. It will be apparent by referring to Fig. 19 that the rightward or clockwise movement of the control stick 175 in rotating each of the sheaves 147 counter-clockwise will cause the left aileron panel 46 to be locked in neutral position and the right aileron panel 46 to be raised to effective disposition and thereby cause the right wing of the aircraft to dip.

It is contemplated that the control stick 175 will be manipulated in the conventional manner to control the aircraft as described above but that manually operable means will be provided for lowering both of the cable anchorages 178 and 181 simultaneously to cause both the aileron panels 46 to rise simultaneously. The downward movement of the two cable anchorages is indicated by dotted line positions in Fig. 22. The movement of the upper cable anchorage 178 toward the upper parallel sheave 177 feeds out the cable 47b toward the two sheaves 147, and the downward movement of the lower cable anchorage 181 away from the two lower parallel sheaves 180 takes up the cable from the two sheaves 147, the result being clockwise rotation of the left sheave 147 to raise the left aileron panel 14 and simultaneously clockwise rotation of the right sheave 147 to raise the right aileron panel.

A suggested construction for the control stick 175 is indicated by Figs. 23—26. A tubular rocker shaft 182 disposed longitudinally of the aircraft carries a cross pin 183 on which is pivotally mounted an inner yoke in the form of a ring 185 and an outer yoke 186, the outer yoke having a slot 187 on each side for sliding engagement with the cross pin. The inner yoke 185 has an upper arm 188 carrying the upper pair of parallel sheaves 177 and has a lower arm 190 on which is mounted the lower pair of parallel sheaves 180. The outer yoke 186 has an upper tubular arm 191 slidingly telescoped over the corresponding arm 188 and has a lower tubular arm 192 telescoped over the corresponding arm 190. The two cable anchorages 178 and 181 may be in the form of metal bars extending through and carried by the corresponding tubular arm of the outer yoke 186, the inner arms 188 and 190 having longitudinal slots 193 clearing the cable anchorages to permit the desired range of relative axial movement of the outer yoke.

Normally the outer yoke 186 with its two tubular arms is held at an upper position relative to the inner yoke 185 by a releasable latch of suitable construction. My preferred form of latch, shown specifically in Fig. 26, includes a latch body 195 mounted in the end of the upper outer arm 191 and telescoping into the hollow upper end of the inner arm 188. Normally a pawl 196 mounted on the latch body 195 by a pivot 197 is pressed laterally by a leaf spring 198 into a position of engagement with the upper end of the inner arm 188 as shown. A release button 200 normally protruding from the upper end of the latch body 195 is mounted on the upper end of a release plunger 201 that extends downwardly into the latch body. The release plunger 201 has a tapered end 202 to act against the pawl 196 and is held against rotation by a pin 203 that is mounted in the latch body 195 and extends into a spline slot 205 in the plunger. When the button 200 is depressed by the pilot against the resistance of a concealed spring 206, the release plunger 201 swings the pawl 196 inward out of engagement with the upper end of the inner arm 188 so that the pilot may slide the outer yoke with its two arms downward, thereby shifting the two cable anchorages downward and lifting both the aileron panels simultaneously.

The operation of my invention may be readily understood from the foregoing description. Preparatory to take-off the pilot rotates the crank 36 to shift the two flaps 33 to positions of intermediate extension, as shown in Fig. 6. At this disposition each flap 33 cooperates with the main wing 32 to form an airfoil affording relatively high lift and only moderate drag. After take-off the pilot again manipulates the crank 36 to retract each of the flaps 33 to the position shown in Fig. 5 at which position the trailing portion 35 of the flap protruding from the main wing 32 combines with the main wing to form an inherently high speed airfoil with minimum drag. For maneuvering the aircraft at normal high speed flight the pilot shifts the control stick 175 slightly from side to side to cause the two aileron panels to rise alternately to positions of relatively low inclination.

Preparatory to gliding the aircraft to a landing, the pilot turns the crank 36 to extend each of the flaps 33 to the maximum position shown in Fig. 7, thereby increasing the effective chord and camber of the wing to produce relatively high lift and relatively high drag. As the flap approaches the position of maximum extension the air-jet passage through the main wing 32 around the leading edge of the flap becomes increasingly effective to permit air flow from the under side of the wing to the upper side and over the extended flap. This displacement of air through the wing improves the flow of air over the upper surface of the wing, delaying the burble point and permitting the aircraft to descend with the wings at high angles of attack and at relatively slow speed without danger of stalling even at high loads.

It is also to be noted that as a flap 33 approaches its position of maximum extension the increase in the clearance between the flap and the edges of the rearward wing opening 60 provides increasing freedom for air flow through the wing to the aileron opening on the upper side of the wing so that opening movement of the aileron panel permits more effective air flow for lateral control at the extended positions of the flap than at the normal retracted position of the flap. The provision for air flow through the aileron opening and especially the provision for increased freedom for air flow with increased extension of the flap 33 results in sensitive and effective lateral control of the aircraft at relatively low air speeds and relatively high angles of attack.

The various rollers supporting each flap may be given liberal clearance for freedom of movement without inviting vibration of the flap because aerodynamic forces on the flap causes one of each pair of rollers to act as a fulcrum and the other roller to limit rotation about the fulcrum. The leverage through each pair of rollers exerted by the panel causes a forward component of force along the arcuate path of the flap that is effective at all dispositions of the flap and results in a constant but moderate tendency for the flap to retract.

One feature of my invention is the conception of housing the retractible tracks in the longitudinal recesses at the sides of the flap panels. The tracks are concealed and protected when in extended positions. While the flap panels are separately supported at their longitudinal edges, they are spaced apart only sufficiently to clear the various wing ribs on which the tracks are supported.

As the aircraft approaches the end of the landing glide the pilot may press the release button 200 on the control stick and shift the control stick handle downward to raise both the aileron panels simultaneously thereby to suddenly and sharply decrease the lift of the two wings.

For the purpose of disclosure and to teach the principles involved, I have described a preferred embodiment of my invention in specific detail, and sufficient guidance will be found herein for adapting the invention and the various features of the invention to various types of aircraft.

My specific disclosure will suggest to those skilled in the art various changes, modifications, and substitutions within the scope of the underlying inventive concept, and I specifically reserve the right to all such changes, modifications, and substitutions that come within the terms of my appended claims.

I claim as my invention:

1. In an aircraft, the combination of: a main wing having a hollow rear portion with a spanwise rear opening; a first support member rigidly incorporated in said wing; a second support member normally telescoped into said rear portion of the main wing for retractible longitudinal movement from the wing through said rear opening; a curved guideway rigidly mounted on one of said support members; cooperating guide means mounted on the other support member in engagement with said guideway for movement along the guideway; a flap constituting a third member, said flap being normally telescoped into said hollow portion of the wing for retractible edgewise movement through said rear opening; a curved guideway fixedly mounted on one of said last two mentioned members; guide means on the other of said last two mentioned members in cooperative engagement with said last mentioned guideway for movement along said guideway; and means operatively connected to said flap member to move the flap member to various positions of extension from said main wing.

2. In an aircraft, the combination of: a main wing having a hollow spanwise rear portion; a support means movably mounted in said hollow portion of the wing for retractible extension rearward from the wing along a downward curved path; a flap normally telescoped into said rear portion of the wing and movably mounted on said support means for edgewise movement relative to the support means substantially in a curved continuation of said curved path, said flap having a curved upper surface substantially concentric with said path and disposed as a continuation of the upper surface of said wing, the under surface of said flap being relatively smooth toward the trailing end of the flap and of broken configuration toward the forward end of the flap whereby said portion of broken configuration becomes effective to increase drag as the flap approaches maximum extension.

3. In an aircraft, the combination of: a main wing with a rearward spanwise opening; a plurality of spaced ribs dividing the rear portion of said wing into a series of flap compartments; support means movably mounted in each of said compartments for retractible endwise movement rearward through said opening; and a flap panel in each of said compartments movably mounted on the support means therein to retractibly move relative to the support means edgewise through said opening rearward from the trailing edge of the wing, the trailing portions of said flap panels being interconnected to form a unitary trailing edge of the wing.

4. In an aircraft, the combination as set forth in claim 3 that includes rolling means movably supporting said support means on said ribs, and includes rolling means movably supporting said flap panels on said support means.

EDWARD F. ZAP.